United States Patent
Nagao (10) Patent No.: US 8,891,951 B2
(45) Date of Patent: Nov. 18, 2014

(54) LENS BARREL AND CAMERA SYSTEM CAPABLE OF CORRECTING TRACKING DATA AND CAMERA SYSTEM

(71) Applicant: Canon Kabushiki Kaisha, Tokyo (JP)

(72) Inventor: Yuki Nagao, Utsunomiya (JP)

(73) Assignee: Canon Kabushiki Kaisha (JP)

( * ) Notice: Subject to any disclaimer, the term of this patent is extended or adjusted under 35 U.S.C. 154(b) by 0 days.

(21) Appl. No.: 13/889,519

(22) Filed: May 8, 2013

(65) Prior Publication Data

US 2013/0308932 A1    Nov. 21, 2013

(30) Foreign Application Priority Data

May 18, 2012    (JP) .................................. 2012-114083

(51) Int. Cl.
| | | |
|---|---|---|
| *G03B 17/00* | (2006.01) | |
| *G03B 13/36* | (2006.01) | |
| *G02B 7/10* | (2006.01) | |
| *G02B 7/28* | (2006.01) | |
| *G03B 3/10* | (2006.01) | |

(52) U.S. Cl.
CPC ........ *G03B 13/36* (2013.01); *G03B 2205/0046* (2013.01); *G02B 7/102* (2013.01); *G02B 7/282* (2013.01); *G03B 3/10* (2013.01)
USPC .......................................................... 396/81

(58) Field of Classification Search
CPC .................................................... G02B 7/102
USPC ................................................... 396/80–82
See application file for complete search history.

(56) References Cited

U.S. PATENT DOCUMENTS

| | | | | |
|---|---|---|---|---|
| 4,924,253 | A * | 5/1990 | Imai et al. ........................ | 396/81 |
| 4,950,054 | A * | 8/1990 | Wada et al. .................... | 359/684 |
| 5,196,963 | A * | 3/1993 | Sato et al. ...................... | 359/699 |
| 6,115,552 | A * | 9/2000 | Kaneda ............................ | 396/82 |
| 6,178,051 | B1 * | 1/2001 | Tanaka ........................... | 359/698 |
| 6,853,006 | B2 * | 2/2005 | Kataoka et al. ................. | 257/77 |
| 6,989,865 | B1 * | 1/2006 | Ohta .............................. | 348/347 |
| 7,095,566 | B2 * | 8/2006 | Suzuki et al. ................. | 359/696 |
| 7,710,491 | B2 * | 5/2010 | Ohta .............................. | 348/345 |
| 2013/0308932 | A1 * | 11/2013 | Nagao ............................ | 396/125 |

FOREIGN PATENT DOCUMENTS

| | | |
|---|---|---|
| JP | 11-109213 A | 4/1999 |
| JP | 2002-267920 A | 9/2002 |
| JP | 4441018 B2 | 3/2010 |

* cited by examiner

*Primary Examiner* — W B Perkey
(74) *Attorney, Agent, or Firm* — Rossi, Kimms & McDowell LLP (57) ABSTRACT

A lens barrel includes a moving lens unit that moves in accordance with a zooming operation, a focus lens that moves to correct an image plane variation caused by a movement of the moving lens unit, a driver that moves the focus lens, a controller that controls the driver, a zoom state detector that detects a zoom state, a focus lens detector that detects a position of the focus lens, a storage portion that stores tracking data indicating the position of the focus lens to correct the image plane variation, and a data correction portion that measures a real position of the focus lens in an in-focus state in a plurality of zoom states for each zooming operation in directions from wide angle to telephoto sides and from the telephoto to wide angle sides to generate correction data and correct the tracking data based on the correction data.

6 Claims, 5 Drawing Sheets

LENS BARREL AND CAMERA SYSTEM CAPABLE OF CORRECTING TRACKING DATA AND CAMERA SYSTEM

BACKGROUND OF THE INVENTION

1. Field of the Invention

The present invention relates to a lens barrel capable of correcting tracking data to correct an image plane variation.

2. Description of the Related Art

Previously, in a lens barrel (a zoom optical system), since an image plane variation is generated in moving a lens unit to perform a magnification-varying operation, a control is performed so that a focus lens is moved to correct the image plane variation to maintain an in-focus state. A movement locus (a movement track) of the focus lens is previously defined as an electronic cam track (tracking data) that indicates a position of the focus lens with respect to a position of a moving lens unit for each object distance. In order to perform the magnification-varying operation while maintaining the in-focus state in this zoom optical system, it is necessary for the position of the moving lens unit and the position of the focus lens to exactly hold a relation defined by the tracking data.

However, when the position of the moving lens unit tries to be directly detected, reduction in size is prevented and cost is increased since a detector needs to be disposed near the zoom optical system. Therefore, a configuration of indirectly detecting the position of the moving lens unit is proposed, but a hysteresis is generated by the existence of a component of tracking delay such as a backlash or a flexure between the detector and the moving lens unit, and therefore the position of the moving lens unit cannot be exactly known.

Japanese Patent No. 4441018 discloses an optical apparatus capable of correcting a shift of an imaging plane even when a hysteresis exists in shooting using an optical system including the moving lens unit. This optical apparatus detects a hysteresis in zooming from a wide angle side to a telephoto side and from the telephoto side to the wide angle side, and corrects this hysteresis when a zoom direction is reversed.

The configuration of Japanese Patent No. 4441018 is effective when the hysteresis is uniform over an entire zoom range, i.e. when the hysteresis is uniform independently of a zoom position. However, actually, the hysteresis is different in accordance with the zoom position due to a flexure or a backlash of a part constituting a drive system or a configuration of a detection system. Therefore, in the configuration of Japanese Patent No. 4441018, the influence of the hysteresis over the entire zoom range cannot be reduced.

SUMMARY OF THE INVENTION

The present invention provides a lens barrel and a camera system that reduce an influence of a hysteresis caused by a zooming operation over an entire zoom range so as to effectively correct an image plane variation.

A lens barrel as one aspect of the present invention includes a moving lens unit configured to move in accordance with a zooming operation, a focus lens configured to move so as to correct an image plane variation caused by a movement of the moving lens unit, a driver configured to move the focus lens, a controller configured to control the driver, a zoom state detector configured to detect a zoom state, a focus lens detector configured to detect a position of the focus lens, a storage portion configured to store tracking data indicating the position of the focus lens to correct the image plane variation, and a data correction portion configured to measure a real position of the focus lens in an in-focus state in a plurality of zoom states for each of the zooming operations in a direction from a wide angle side to a telephoto side and a direction from the telephoto side to the wide angle side so as to generate correction data and correct the tracking data based on the correction data.

A camera system as another aspect of the present invention includes the lens barrel.

Further features and aspects of the present invention will become apparent from the following description of exemplary embodiments with reference to the attached drawings.

BRIEF DESCRIPTION OF THE DRAWINGS

FIGS. 5A and 5B are diagrams of illustrating an influence of an image plane shift that is generated in a lens barrel of Embodiment 3 when zooming is reversed, and FIG. 5A illustrates a case in which measurement zoom states are set to be predetermined positions and FIG. 5B illustrates a case in which measurement zoom states are set at regular intervals.

DESCRIPTION OF THE PREFERRED EMBODIMENTS

Exemplary embodiments of the present invention will be described below with reference to the accompanied drawings. In each of the drawings, the same elements will be denoted by the same reference numerals and the duplicate descriptions thereof will be omitted.

(Embodiment 1)

Figure 1:
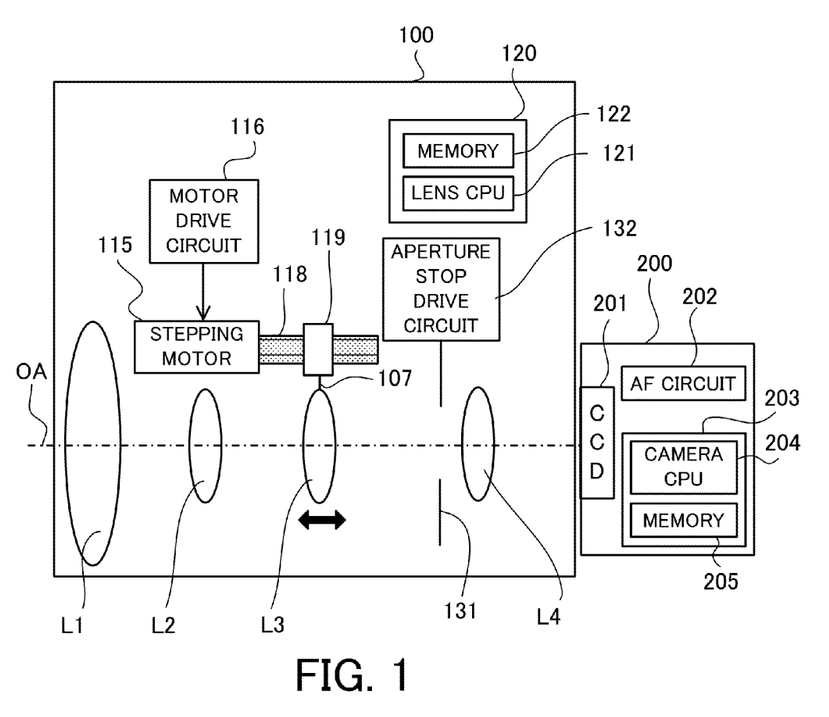
FIG. 1 is a block diagram of illustrating a schematic configuration of a lens barrel (an optical apparatus) in Embodiment 1.

First of all, referring to FIGS. 1 to 4, an optical apparatus in Embodiment 1 of the present invention will be described. FIG. 1 is a block diagram of illustrating a schematic configuration of an optical apparatus (a lens barrel 100) in the present embodiment.

In FIG. 1, symbols L1 to L4 denote first to fourth lens units (an optical system). A zoom lens is configured by four lens units of the first to fourth lens units L1 to L4. The first lens unit L1, the second lens unit L2, and the fourth lens unit L4 are moving lens units, each of which moves on an optical axis OA along a locus different from each other in zooming (by a zooming operation). The third lens unit L3 is a focus unit (a focus lens) that has a function as a compensator that corrects an image plane variation caused by a focus function and a magnification-varying operation (a movement of the moving lens units). In the optical system of the lens barrel 100, an aperture stop 131 that adjusts a light intensity is provided. The aperture stop 131 is driven by an aperture stop drive circuit 132.

The lens barrel 100 of the present embodiment is an interchangeable lens that is removably mounted on a camera 200 (a camera body). The camera 200 is configured by including a CCD 201 (an image pickup element) that takes an object image via the lens barrel 100, an AF circuit 202 that performs a focus operation, and a microprocessor 203. The microprocessor 203 includes a camera CPU 204 that controls the operation of the camera 200 and a memory 205 that stores various kinds of data. A camera system is configured by the lens barrel 100 and the camera 200. However, the present embodiment is not limited to this, and can also be applied to a camera system which is integrally configured by the lens barrel and the camera.

Figure 2:
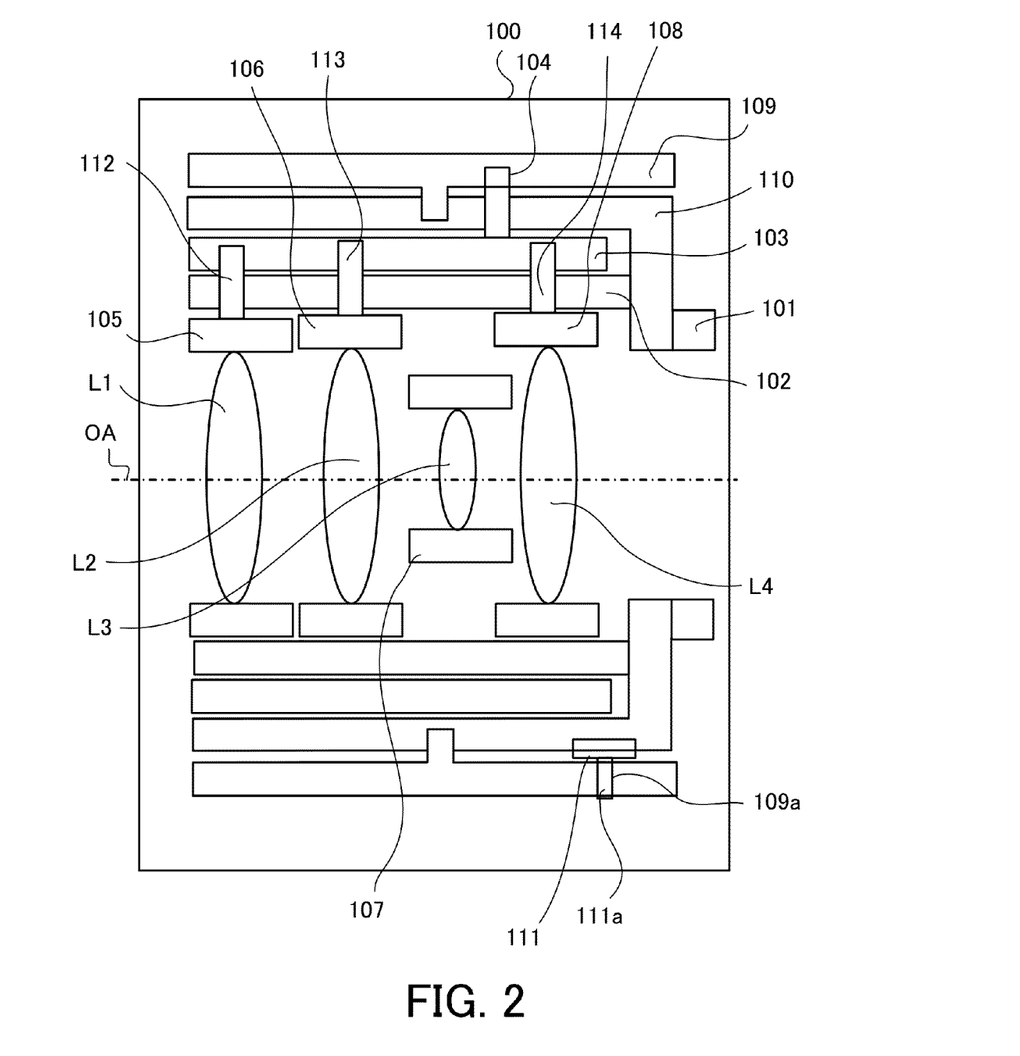
FIG. 2 is a cross-sectional diagram of illustrating a main part of the lens barrel in Embodiment 1.

Subsequently, referring to FIGS. 2, 3A, and 3B, a mechanical configuration of holding a zoom optical system will be described. FIG. 2 is a cross-sectional diagram of illustrating a main part of the lens barrel 100. The lens barrel 100 includes a mount 101 that is used to connect the camera 200, a fixed cylinder 110 that is fixed to the mount 101, a guide cylinder 102 that is fixed to the fixed cylinder 110, and a cam cylinder 103 that fits the guide cylinder 102 in a radial direction and that is held so as to be relatively rotatable around an optical axis. Furthermore, the lens barrel 100 includes a zoom ring 109 that fits the fixed cylinder 110 in the radial direction and that is rotatable around the optical axis by a predetermined angle (a zoom rotation angle) for the fixed cylinder 110. A linear sensor 111 (a zoom state detector) that detects a zoom state (a zoom position) is fixed to the fixed cylinder 110. A knob 111a of the linear sensor 111 fits into a cam that is formed on the zoom ring 109, and thus the knob 111a is configured to move back and forth in an optical axis direction along with a rotation of the zoom ring 109.

Figure 3A:
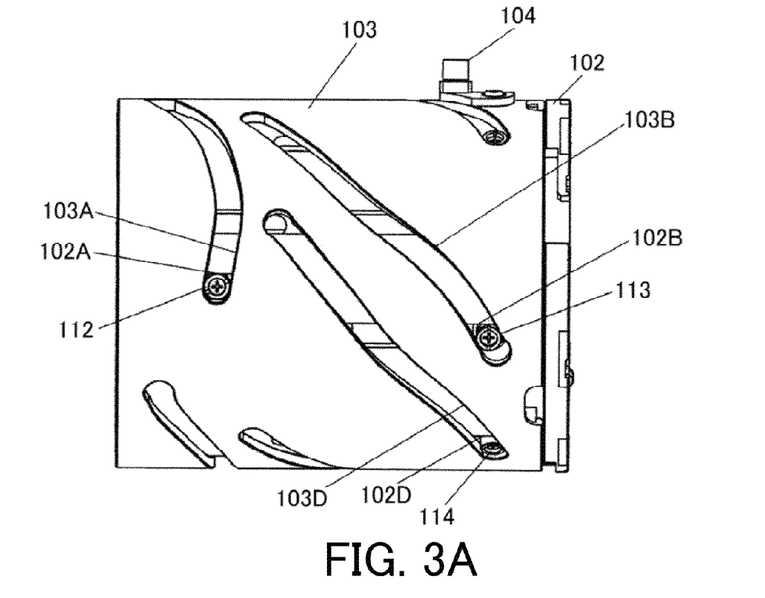
FIGS. 3A and 3B are perspective diagrams of illustrating a main part of the lens barrel in Embodiment 1.
Figure 3B:
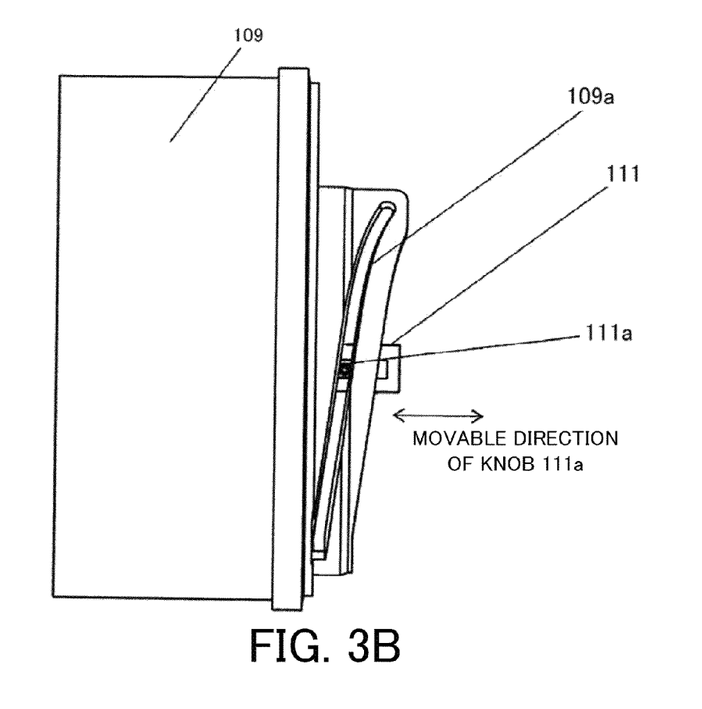

FIGS. 3A and 3B are configuration diagrams of illustrating main parts of the guide cylinder 102 and the cam cylinder 103 of the lens barrel 100. As illustrated in FIG. 3A, straight guide grooves 102A, 102B, and 102D are formed on the guide cylinder 102, and cam grooves 103A, 103B, and 103D are formed on the cam cylinder 103. A zoom transmission key 104 that engages with the zoom ring 109 and that gives a torque to the cam cylinder 103 along with the rotation of the zoom ring 109 is fixed on an outer circumferential surface of the cam cylinder 103.

In the present embodiment, the lens barrel 100 includes a first lens barrel 105 that is supported by the guide cylinder 102 and the cam cylinder 103, a second lens barrel 106, and a fourth lens barrel 108 (collectively referred to as a "lens barrel unit"). During a zoom operation, each of the first lens barrel 105, the second lens barrel 106, and the fourth lens barrel 108 moves in the optical axis direction along a predetermined cam track (a predetermined cam locus).

The first lens barrel 105 holds the first lens unit L1. A cam follower 112 is attached to an outer circumferential portion of the first lens barrel 105, and the cam follower 112 fits into both the straight guide groove 102A and the cam groove 103A. The second lens barrel 106 holds the second lens unit L2. A cam follower 113 is attached to an outer circumferential portion of the second lens barrel 106, and the cam follower 113 fits into both the straight guide groove 102B and the cam groove 103B. The fourth lens barrel 108 holds the fourth lens unit L4. A cam follower 114 is attached to an outer circumferential portion of the fourth lens barrel 108, and the cam follower 114 fits into both the straight guide groove 102D and the cam groove 103D. According to such configurations, the first lens barrel 105, the second lens barrel 106, and the fourth lens barrel 108 are configured to be movable back and forth in the optical axis direction in accordance with the rotation of the cam cylinder 103.

Next, a drive configuration of the focus unit (the third lens unit L3) in the lens barrel 100 will be described. As illustrated in FIG. 1, a third lens barrel 107 holds the third lens unit L3 as the focus unit. The third lens barrel 107 is held so as to be movable in the optical axis direction by a stepping motor 115. Actually, the third lens barrel 107 is held by a lens holding member that is guided in the optical axis direction along a guide bar extending in the optical axis direction. In FIG. 1, the guide bar and the lens holding member are omitted.

Reference numeral 115 denotes a stepping motor that is a drive source of the third lens barrel 107. Reference numeral 116 denotes a motor drive circuit that drives the stepping motor 115. A driver that moves the third lens barrel 107 (the third lens unit L3) is configured by the stepping motor 115 and the motor drive circuit 116. The motor drive circuit 116 is controlled by a lens CPU 121 (a controller) of a microprocessor 120 so as to drive the stepping motor 115 based on a control signal from the lens CPU 121.

An output shaft of the stepping motor 115 is formed as a feed screw 118. A rack 119 that is attached to the third lens barrel 107 engages with the feed screw 118. A drive mechanism is configured by the feed screw 118 and the rack 119. The stepping motor 115 is driven so as to rotate the feed screw 118, and thus the feed screw 118 engages with the rack 119 and a drive force of the stepping motor 115 is transmitted to the third lens barrel 107. According to this configuration, the third lens barrel 107 can be moved in the optical axis direction (an arrow direction illustrated in FIG. 1).

In the present embodiment, a drive control of the stepping motor 115 is performed by using an open-loop control method. Specifically, first of all, the lens CPU 121 drives the stepping motor 115 via the motor drive circuit 116 so as to move the third lens barrel 107 to a predetermined reference position when the power of the camera 200 is turned on. This operation is called a focus reset operation. The movement of the third lens barrel 107 to the reference position is detected by a reference position sensor (not shown). The reference position sensor is for example configured by a photo interrupter. In this case, a light shielding portion that is provided at the third lens barrel 107 is inserted between a light emitting portion and a light receiving portion of the photo interrupter and the photo interrupter is switched from a light receiving state to a light shielding state. As a result, the movement of the third lens barrel 107 to the reference position is detected.

After the focus reset operation is performed, the lens CPU 121 drives the stepping motor 115 so as to move the third lens barrel 107 to a shooting start position (for example, an infinity position). As a result, the shooting can be started. The number of drive pulses that is to be applied to the stepping motor 115 when the third lens barrel 107 moves from the reference position to the infinity position is previously stored in a memory 122 that is provided in the microprocessor 120.

The lens CPU 121 calculates the pulse number of drive pulse signals (hereinafter, referred to as a "number of drive pulses") that is to be applied to the stepping motor 115 when a focus drive instruction (a manual focus) is obtained by a user or an AF (an autofocus) operation is performed. Then, the lens CPU 121 applies the drive pulse signal to the stepping motor 115 via the motor drive circuit 116. Thus, in the present embodiment, the third lens barrel 107 as the focus unit is driven by using the open-loop control method.

In the present embodiment, using a count value of the number of the drive pulses of the stepping motor 115, position information of the third lens barrel 107 with reference to the reference position can be obtained. Thus, the lens CPU 121 is a focus lens detector that detects a position of the third lens barrel 107 (the third lens unit L3). However, there is a backlash between the feed screw 118 and the rack 119 that constitute the drive mechanism of the third lens barrel 107. In addition, a manufacturing error of the feed screw 118 or the rack 119 or an individual difference of a drive amount of the stepping motor 115 for the number of the drive pulses exists. In this case, the position information of the third lens barrel 107 (the third lens unit L3) obtained from a count value of the number of the drive pulses and a real position of the third lens barrel 107 do not strictly coincide with each other, and there is a small difference between them.

Next, a mechanism of detecting the zoom state (the zoom position) will be described. In the present embodiment, a rotation amount of the zoom ring 109 is detected so as to detect the zoom state. Actually, as illustrated in FIG. 3B, a non-linear cam 109a is provided on the zoom ring 109. A knob 111a of the linear sensor 111 fits into the cam 109a. The linear sensor 111 is configured so that a sensor output changes in accordance with a moving state of the knob 111a, which is a sensor that detects the sensor output to obtain the position. The lens CPU 121 reads a change of a detected value of the linear sensor 111 in accordance with the back and forth movements of the knob 111a of the linear sensor 111 that fits into the cam 109a along with the rotation of the cam cylinder 103 so as to obtain the zoom state.

However, each of the first lens barrel 105, the second lens barrel 106, the fourth lens barrel 108, and the linear sensor 111 that moves in zooming is configured so as to be driven based on a fitting relation of the cam groove and the cam follower or the knob 111a. Therefore, there is a small fitting backlash. Accordingly, when a zooming direction is reversed, i.e. a rotation direction of the cam cylinder is changed from one direction to an opposite direction, for a moment, the knob 111a, the first lens barrel 105, the second lens barrel 106, and the fourth lens barrel 108 do not move on the optical axis, and instead they start to move late. Since the time of the delay is determined in accordance with a backlash amount, a certain lens barrel moves first, the knob 111a moves second, and subsequently another lens barrel moves.

Therefore, even when the output of the linear sensor 111 that detects the zoom state is the same (hereinafter, referred to as "the same zoom state"), a phenomenon that a relative relation of each lens unit has a hysteresis in accordance with the rotation direction of the cam cylinder 103 is generated. An amount of the hysteresis is different in accordance with a zoom range, based on relationships of a difference of an inclination angle of the drive cam in a specific zoom state, a uniformity of a width of the cam groove, a roundness of the cam follower or the knob of the linear sensor, or the like, and thus the amount of the hysteresis is not uniform. Therefore, when a design value of an electronic cam track (tracking data) is corrected while assuming that the hysteresis is uniform in any zoom states so as to drive the focus lens along a corrected track (a corrected locus), there is a case in which an highly-accurate in-focus state cannot be maintained in accordance with the zoom range. Therefore, in the present embodiment, the hysteresis of the zooming direction for the relation between the output of the linear sensor 111 and the position of the lens barrel unit is stored for a plurality of zoom states, and the design value of the electronic cam track (the tracking data) that is used to the drive control of the focus lens is corrected.

In the present embodiment, the memory 122 (a storage portion) of the lens barrel 100 stores the tracking data that indicate the position of the third lens unit L3 to correct an image plane variation. The lens CPU 121 (a data correction portion) measures a real position of the third lens unit L3 in the in-focus state for the plurality of zoom states with respect to each of zooming operations of a direction from a wide angle side (a wide side) to a telephoto side (a tele side) and a direction from the telephoto side to the wide angle side so as to generate correction data. Then, the lens CPU 121 (the data correction portion) corrects the design value of the electronic cam track (the tracking data) based on the generated correction data.

Figure 4:
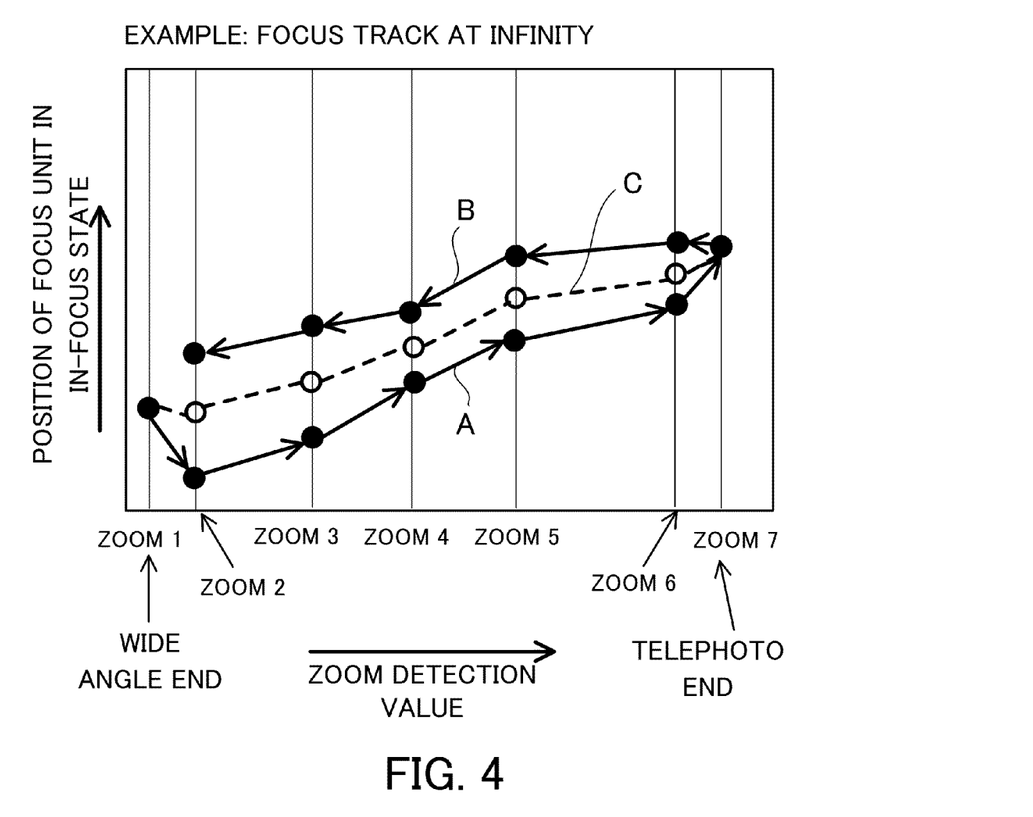
FIG. 4 is a diagram of illustrating a cam curve at infinity (∞) for the lens barrel in Embodiment 1.

Next, referring to FIG. 4, a specific example of a correction data calculating method to correct the design value of the electronic cam track (the tracking data) will be described. FIG. 4 is a diagram of illustrating a cam curve at infinity (a focus track at infinity) of the lens barrel 100. First of all, the focus lens position when the zoom operation is performed in a direction from a wide angle end (a wide end) to a telephoto end (a tele end) is measured, and a measurement value A (a first measurement value) is obtained. At a position of ZOOM 1 (at the wide end), focusing on an object at a predetermined distance is performed (in the embodiment, the distance is infinity ($\infty$) since the design value of the electronic cam track that is used for the object at infinity is corrected). Then, the focus lens position (a measurement value $A_1$) obtained in this time is for example stored in the memory 122. Next, at a position of ZOOM 2, focusing on the same object as described above (the object at infinity) is performed. Then, the focus lens position (a measurement value $A_2$) in this time is stored. For ZOOM 3, ZOOM 4, ..., and up to ZOOM 7 (the tele end), the same operations (storing measurement values $A_3, A_4, \ldots, A_7$) are performed. In the present embodiment, the position of ZOOM 7 is the tele end, but the embodiment is not limited to this and a position of ZOOM N ($N \geq 3$) can be generally set as the tele end.

Next, the zooming direction is reversed, and for ZOOM 6 (ZOOM N-1), ZOOM 5 (ZOOM N-2), ..., up to ZOOM 2, focus lens positions (measurement values $B_6, B_5, \ldots, B_2$) in the in-focus state are measured similarly to the above case so as to obtain a measurement value B (a second measurement value).

An average value (a plot indicated by a white circle in FIG. 4) of the focus lens position measured in each zooming direction (a plot indicated by a black circle in FIG. 4) and a difference of positions obtained when moving back and force are for example stored in the memory 122. The lens CPU 121 corrects the design value of the electronic cam track (the tracking data) based on the stored information. In the present embodiment, "C" indicated in FIG. 4 is the average value (an intermediate value) of the measurement value A and the measurement value B. Therefore, the lens CPU 121 corrects the electronic cam track based on the average value C (average values $C_2, C_3, \ldots, C_6$) as follows.

First of all, correction data CO (correction data $CO_2, CO_3, \ldots, CO_6$) that are differences between the design values of the electronic cam track and the average values C (the average values $C_2, C_3, \ldots, C_6$) are obtained for each position of ZOOM N ($2 \leq N \leq 6$). Next, the design values of the electronic cam track are shifted by the correction data $CO_N$ ($1 \leq N \leq 7$) for the position of ZOOM N ($1 \leq N \leq 7$). As the correction data $CO_1$ and $CO_7$ at the positions of ZOOM 1 and ZOOM 7 (the wide end and the tele end), differences between the design values of the electronic cam track and the measurement values $A_1$ and $A_7$ are used, respectively. Then, the value obtained by shifting the design value of the electronic cam track by the correction data CO is set as a corrected electronic cam track (corrected tracking data) so as to control an image plane correction in zooming.

Thus, the lens CPU 121 (the data correction portion) uses the first measurement value that is measured during the zooming operation in the direction from the wide angle side to the telephoto side and the second measurement value that is measured during the zooming operation in the direction from the telephoto side to the wide angle side so as to generate correction data. Then, the lens CPU 121 uses the corrected electronic cam track (the corrected tracking data) so as to control the image plane correction in zooming.

The above method can also be used for a correction of a design value of an electronic cam track that focuses on a short-distance object or an electronic cam track (tracking data) that focuses on an object at a distance between the infinity and the short distance (0.6 m, 0.8 m, 1 m, 2 m, 4 m, 10 m, or the like), as well as the correction of the design value of the electronic cam track (tracking data) that focuses on the object at infinity.

The method of controlling the image plane correction using the obtained cam curve at infinity (the obtained focus track at infinity) described above can also be used for the correction of the design value of the electronic cam track that focuses on the short-distance object or the electronic cam track (tracking data) that focuses on the object at the distance between the infinity and the short distance (0.6 m, 0.8 m, 1 m, 2 m, 4 m, 10 m, or the like), as well as the correction of the design value of the electronic cam track (tracking data) that focuses on the object at infinity. In other words, an average value C that is obtained from a certain electronic track (for example, an electronic cam track that focuses on the object at infinity) may be used to correct a design value of an electronic cam track corresponding to another electronic cam track.

According to the present embodiment, in-focus accuracy is improved and the influence of the hysteresis for the in-focus accuracy can be reduced. Therefore, an in-focus state can be maintained with high accuracy.

(Embodiment 2)

Next, a method of correcting a design value of an electronic cam track (tracking data) in Embodiment 2 of the present invention will be described. The correction method of the present embodiment is effective to further reduce the influence of a hysteresis. A basic configuration of a lens barrel in the present embodiment is similar to that of Embodiment 1, and therefore descriptions of the basic configuration are omitted.

First of all, similarly to Embodiment 1, a focus lens position of an in-focus state in a predetermined zoom state is stored for each zooming direction. Then, correction data of an electronic cam track that are applied to a case where a zoom operation in a direction from the wide end to the tele end is performed and correction data of an electronic cam track that are applied to a case where a zoom operation in a direction from the tele end to the wide end are made.

The lens CPU 121 detects whether the output of the linear sensor 111 is an increasing direction or a decreasing direction to be able to determine the zooming direction. Therefore, the lens CPU 121 changes the correction data of the electronic cam track that is to be selected in accordance with the zooming direction so as to correct an electronic cam track suitably for each zooming direction.

For example, the lens CPU 121 makes the correction data of the electronic cam track using the measurement value A (the first measurement value) in FIG. 4 in zooming in the direction from the wide end to the tele end. Specifically, first of all, correction data ACO (correction data $ACO_N(N \geq 1)$) that are differences between design values of the electronic cam track and the measurement values A (measurement values $A_N$ ($N \geq 1$)) are obtained for each position of ZOOM N ($N \geq 1$). Next, the design values of the electronic cam track are shifted by the correction data $ACO_N$ ($N \geq 1$) for each position of ZOOM N ($N \geq 1$). Then, the value obtained by shifting the design value of the electronic cam track by the correction data $ACO_N$ ($N \geq 1$) is set as a corrected electronic cam track (corrected tracking data) so as to control an image plane correction in zooming in the direction from the wide angle end (the wide end) to the telephoto end (the tele end).

On the other hand, the lens CPU 121 generates the correction data of the electronic cam track (the tracking data) using the measurement value B (the second measurement value) in FIG. 4 in zooming in a direction from the tele end to the wide end. Specifically, first of all, correction data BCO (correction data $BCO_N(N \geq 1)$) that are differences between design values of the electronic cam track and the measurement values B are obtained for each position of ZOOM N ($N \geq 1$). Next, the design values of the electronic cam track are shifted by the correction data $BCO_N$ ($N \geq 1$) for each position of ZOOM N ($N \geq 1$). Then, the value obtained by shifting the design value of the electronic cam track by the correction data $BCO_N$ ($N \geq 1$) is set as a corrected electronic cam track (corrected tracking data) so as to control the image plane correction in zooming in the direction from the telephoto end (the tele end) to the wide angle end (the wide end).

Thus, the lens CPU 121 (the data correction portion) uses the first measurement value measured in the zooming operation in the direction from the wide angle side (the wide side) to the telephoto side (the tele side) as correction data for this zooming operation. Similarly, the lens CPU 121 uses the second measurement value measured in the zooming operation in the direction from the telephoto side to the wide angle side as correction data for this zooming operation.

When the actuator that gives the torque to the cam cylinder 103 via the zoom transmission key 104 is the stepping motor, the zooming direction can be obtained based on the drive pulse signal. In addition, a sensor that detects a moving amount of each lens barrel or the like is provided, the zooming direction can be detected based on a moving direction of the lens barrel.

The above method can also be used for a correction of a design value of an electronic cam track that focuses on a short-distance object or an electronic cam track (tracking data) that focuses on an object at a distance between the infinity and the short distance (0.6 m, 0.8 m, 1 m, 2 m, 4 m, 10 m, or the like), as well as the correction of the design value of the electronic cam track (tracking data) that focuses on the object at infinity.

The method of controlling the image plane correction using the obtained cam curve at infinity (the obtained focus track at infinity) described above can also be used for the correction of the design value of the electronic cam track that focuses on the short-distance object or the electronic cam track (tracking data) that focuses on the object at the distance between the infinity and the short distance (0.6 m, 0.8 m, 1 m, 2 m, 4 m, 10 m, or the like), as well as the correction of the design value of the electronic cam track (tracking data) that focuses on the object at infinity. In other words, correction data ACO and BCO that are obtained from a certain electronic track (for example, an electronic cam track that focuses on the object at infinity) may be used to correct a design value of an electronic cam track corresponding to another electronic cam track.

According to the method of correction the electronic cam track (the tracking data) in the present embodiment, the influence of the hysteresis can be more effectively reduced.

(Embodiment 3)

Next, in Embodiment 3 of the present invention, a plurality of zoom positions (a plurality of zoom states) that are selected in measuring a focus lens position in an in-focus state will be described. It is preferred that the degree of the influence of the hysteresis that is generated in accordance with the zooming directions is determined by considering an image plane sensitivity of each lens unit for each zoom state. The image plane sensitivity of the lens is different from each other. The image plane sensitivity is also different in accordance with the zoom position (the zoom state).

For example, even if the hysteresis of a relation of an output of the linear sensor 111 and a position of each lens barrel of a lens barrel unit exists in accordance with the zooming directions, the influence given to the image plane is small when the sensitivity (the image plane sensitivity) of the lens barrel (the lens unit) with respect to an image plane change is low. On the other hand, when the image plane sensitivity of the lens barrel (the lens unit) is high, the influence given to the image plane is large. Thus, in accordance with the zooming direction, a shift amount of the relation of the output of the linear sensor 111 and the position of each lens barrel (the lens unit) and the image plane sensitivity of the lens unit held by each lens barrel are factors that actually influence on the change of the image plane.

Figure 5A:
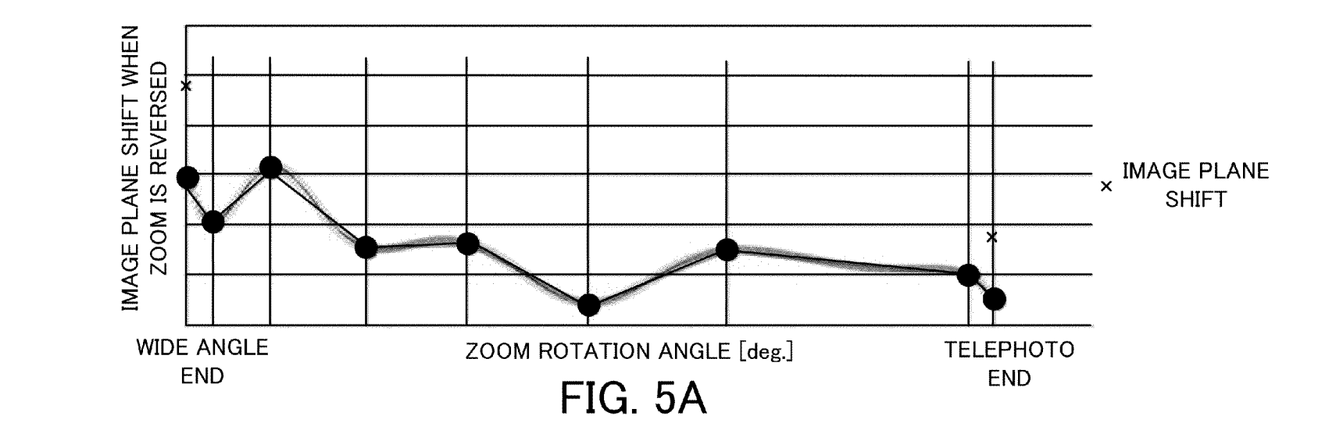
Figure 5B:
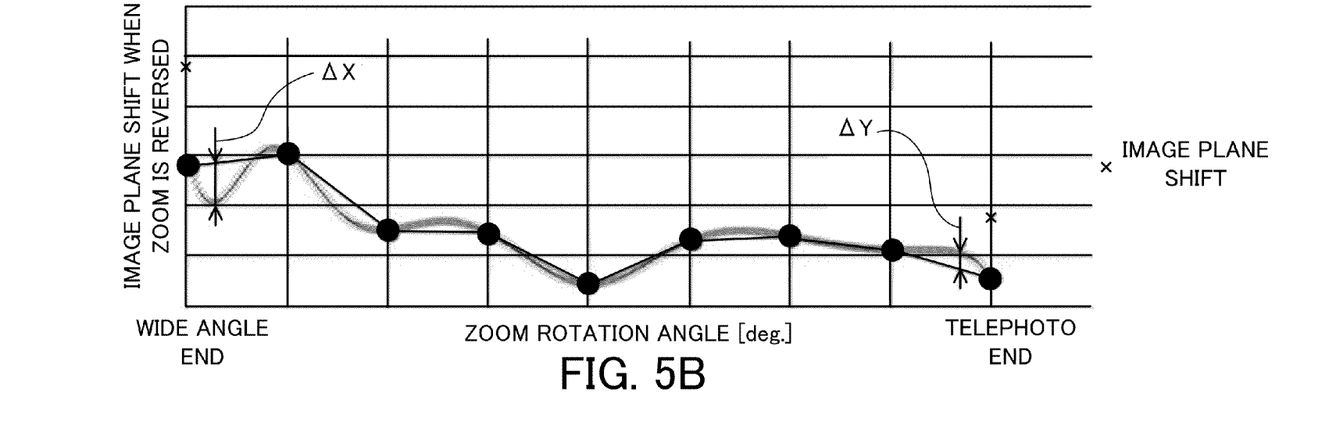

Referring to FIGS. 5A and 5B, a change amount of the image plane shift that is calculated in the lens barrel 100 of the present embodiment will be described. FIGS. 5A and 5B are diagrams of illustrating the influence of the image plane shift that is generated in the lens barrel 100 when the zooming is reversed. FIG. 5A illustrates a case in which measurement zoom states are set to be predetermined zoom states (predetermined zoom positions), and FIG. 5B illustrates a case in which measurement zoom states are set at regular intervals.

In FIGS. 5A and 5B, a lateral axis indicates a zoom state (a rotation angle of the zoom ring, i.e. a zoom position), and a vertical axis indicates a change amount of an image plane (an image plane shift when the zoom is reversed). The graphs of FIGS. 5A and 5B are assumed that a predetermined fitting backlash exists between the cam follower and the width of the cam groove of each lens barrel and that a predetermined fitting backlash exists between the knob of the sensor of a detection system and the width of the cam groove. In such assumptions, FIGS. 5A and 5B illustrate the calculation of the hysteresis of the image plane shift when the zooming direction is reversed, i.e. the image plane shift that is generated when the zooming direction is reversed in a certain zoom state. Referring to these graphs, an amount of the influence of the hysteresis caused by the zooming direction of the relation of the output of the linear sensor 111 and the position of the lens barrel that is generated on the image plane can be estimated.

When the hysteresis is measured, as the zoom position that is to be measured, some of a plurality of positions between the wide end and the tele end are selected. In this case, the hysteresis that is generated at a position other than the zoom position that is to be measured is estimated from a hysteresis amount of an adjacent zoom position that is to be measured. In order to reduce an error of this estimated value as much as possible, as the zoom position that is to be measured, it is preferred that a zoom state in which the change amount of the image plane shift in reversing the zooming operation becomes zero, i.e. a zoom position near an inflection point of the graphs of FIGS. 5A and 5B, is selected. This zoom position is, in other words, a zoom position where an inclination of the change of a focus moving amount per a zoom change amount in the zooming operation from the wide angle end to the telephoto end becomes zero.

In the present embodiment, as the plurality of zoom states (the plurality of zoom positions) where the hysteresis is to be measured, N positions (9 positions in FIG. 5A) including the tele end and the wide end are selected. Then, the hysteresis at positions other than the zoom states (the zoom positions) that are to be measured is estimated by interpolation. In this case, when the zoom positions that are to be measured are simply selected so as to be equally divided into N-1 (in FIG. 5B, equally divided into 8), as illustrated in FIG. 5B, an error $\Delta X$ or $\Delta Y$ may be generated in some cases. Actually, when the lens barrel is assembled, an individual difference is generated by a variation of a part. On the other hand, since the feature of the track of the above graphs (the position of the inflection point or the like) is determined by an optical system or a mechanical system, it does not individually change so much.

Accordingly, the hysteresis is measured at the zoom position that is to be measured, selected as illustrated in FIG. 5A, and the hysteresis at the position other than the zoom position is calculated by the interpolation. According to this configuration, a hysteresis state over an entire zoom range of the lens barrel can be obtained more precisely. When the hysteresis generated for each zoom position obtained as described above is used to calculate the correction data of the electronic cam track and the focus lens is driven in accordance with the corrected electronic cam track, the accuracy of maintaining the image plane state in zooming can be effectively improved.

With respect to the zoom end such as the tele end or the wide end, for example, the zoom position is always determined by a zooming from the wide side to the tele side for the tele end, and is always determined by a zooming from the tele side to the wide side for the wide end. Therefore, in order to improve the interpolation accuracy, it is preferred that the measurement point of the zoom position which is close to the tele side or the wide side is selected to be closer to the tele end or the wide end relative to one of positions equally divided into N-1 (positions equally divided into N zoom states), independently of the graph locus. In other words, it is preferred that a rotation angle of an operation ring from a first zoom state adjacent to the wide angle end (for example, ZOOM 2 in FIG. 4) to the wide angle end (ZOOM 1) is selected so as to be smaller than one rotation angle of rotation angles obtained by equally dividing a rotation angle from the wide angle end to the telephoto end. Similarly, it is preferred that a rotation angle of the operation ring from a second zoom state adjacent to the telephoto end (for example, ZOOM 6 in FIG. 4) to the telephoto end (ZOOM 7) is selected so as to be smaller than one rotation angle obtained by equally dividing the rotation angle from the wide angle end to the telephoto end.

According to each embodiment described above, even when a hysteresis that is different for each zoom state is contained in a moving lens unit or a detection system of the moving lens unit, a shift of an imaging plane caused by the hysteresis is corrected, and a lens barrel and a camera system that maintain a high optical performance can be provided. In other words, the lens barrel and the camera system that reduce an influence of the hysteresis caused by a zooming operation over an entire zoom range so as to effectively correct an image plane variation can be provided.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

For example, in each of the embodiments, a mechanism in which a cam is provided on a rotating zoom ring so as to detect a zoom state while fitting a knob portion of a linear sensor is adopted, but the embodiment can also be applied to a case where the zoom state is detected by using another method. In each of the embodiments, a case in which the zoom ring (the operation ring) is rotated manually so as to drive the lens barrel that is coupled to a cam cylinder is described, but regardless of a manual drive or an electric drive, the method of driving the lens barrel is effective to a case where hysteresis characteristics are indicated in accordance with the zooming directions.

This application claims the benefit of Japanese Patent Application No. 2012-114083, filed on May 18, 2012, which is hereby incorporated by reference herein in its entirety.

What is claimed is:

1. A lens barrel comprising:
   a moving lens unit configured to move in accordance with a zooming operation;
   a focus lens configured to move so as to correct an image plane variation caused by a movement of the moving lens unit;
   a driver configured to move the focus lens;
   a controller configured to control the driver;
   a zoom state detector configured to detect a zoom state; and
   a focus lens detector configured to detect a position of the focus lens,
   wherein the controller controls the driver using tracking data that indicates a position of the focus lens, the tracking data corrected based on a real position of the focus lens in an in-focus state in each of a plurality of zoom states for each of the zooming operations in a direction from a wide angle side to a telephoto side and a direction from the telephoto side to the wide angle side.

2. The lens barrel according to claim 1, wherein the controller corrects the tracking data on a basis of an average value between a first real position that is the real position in the zooming operation in the direction from the wide angle side to the telephoto side and a second real position that is the real position in the zooming operation in the direction from the telephoto side to the wide angle side.

3. The lens barrel according to claim 1,
   wherein the controller corrects the tracking data on a basis of a first real position that is the real position in the zooming operation in the direction from the wide angle side to the telephoto side, and
   corrects the tracking data on a basis of a second real position that is the real position in the zooming operation in the direction from the telephoto side to the wide angle side.

4. The lens barrel according to claim 1, wherein the plurality of zoom states include a zoom state in which a change amount of an image plane shift when the zooming operation is reversed becomes zero.

5. The lens barrel according to claim 1,
   wherein the zooming operation is performed by rotating an operation ring,
   wherein the plurality of zoom states includes a wide angle end and a telephoto end, and
   wherein each of a rotation angle of the operation ring from a first zoom state adjacent to the wide angle end of the plurality of zoom states to the wide angle end and a rotation angle of the rotation ring from a second zoom state adjacent to the telephoto end of the plurality of zoom states to the telephoto end is smaller than one rotation angle of rotation angles obtained by equally dividing a rotation angle from the wide angle end to the telephoto end into zoom states having the same number as that of the plurality of zoom states.

6. A camera system including a lens barrel comprising:
   a moving lens unit configured to move in accordance with a zooming operation;
   a focus lens configured to move so as to correct an image plane variation caused by a movement of the moving lens unit;
   a driver configured to move the focus lens;
   a controller configured to control the driver;
   a zoom state detector configured to detect a zoom state; and
   a focus lens detector configured to detect a position of the focus lens,
   wherein the controller controls the driver using tracking data that indicates a position of the focus lens, the tracking data corrected based on a real position of the focus lens in an in-focus state in each of a plurality of zoom states for each of the zooming operations in a direction from a wide angle side to a telephoto side and a direction from the telephoto side to the wide angle side.

* * * * *